United States Patent
Suwabe et al.

(10) Patent No.: US 10,953,886 B2
(45) Date of Patent: Mar. 23, 2021

(54) VEHICLE LOCALIZATION SYSTEM

(71) Applicant: TOYOTA JIDOSHA KABUSHIKI KAISHA, Toyota (JP)

(72) Inventors: Koki Suwabe, Susonso (JP); Toshiki Matsui, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/571,681

(22) Filed: Sep. 16, 2019

(65) Prior Publication Data

US 2020/0130699 A1   Apr. 30, 2020

(30) Foreign Application Priority Data

Oct. 31, 2018   (JP) .............................. JP2018-204969

(51) Int. Cl.
 *B60W 40/06* (2012.01)
 *B60W 40/105* (2012.01)
 *G05D 1/02* (2020.01)

(52) U.S. Cl.
 CPC .......... *B60W 40/06* (2013.01); *B60W 40/105* (2013.01); *G05D 1/0274* (2013.01); *B60W 2520/16* (2013.01); *B60W 2552/20* (2020.02); *G05D 2201/0213* (2013.01)

(58) Field of Classification Search
 None
 See application file for complete search history.

(56) References Cited

U.S. PATENT DOCUMENTS

| | | | | |
|---|---|---|---|---|
| 5,058,017 A | * | 10/1991 | Adachi | B60G 21/08 701/38 |
| 5,832,400 A | * | 11/1998 | Takahashi | B60W 30/1819 701/53 |
| 2008/0147305 A1 | * | 6/2008 | Kawamata | B60W 40/02 701/117 |
| 2008/0294342 A1 | * | 11/2008 | Hoshizaki | G01S 19/47 701/472 |
| 2009/0018772 A1 | * | 1/2009 | Watanabe | G01S 19/47 701/472 |
| 2013/0213037 A1 | * | 8/2013 | Kitsukawa | F02B 37/11 60/608 |

(Continued)

FOREIGN PATENT DOCUMENTS

JP    2018-021777 A    2/2018

*Primary Examiner* — Curtis J King
(74) *Attorney, Agent, or Firm* — Sughrue Mion, PLLC

(57) ABSTRACT

A vehicle localization system includes: an electronic control unit estimating a vehicle position including a longitudinal position on a map in an extension direction of a road on which the vehicle is traveling and a lateral position on the map in a lateral direction of the road; and a storage device storing a map database including map information. The electronic control unit obtains a vehicle speed and a pitch angle of the vehicle, perceives a measured position of the vehicle on the map based on a measurement result of a positioning device mounted on the vehicle and the vehicle speed, and estimates the longitudinal position from comparison between a rate of change in pitch angle of the vehicle along the road and a rate of change in height on the map along the road, based on the measured position, the map information, and the pitch angle.

2 Claims, 4 Drawing Sheets

(56) References Cited

U.S. PATENT DOCUMENTS

| | | | |
|---|---|---|---|
| 2013/0311086 A1* | 11/2013 | Aoki | G01C 21/005 701/446 |
| 2015/0120153 A1* | 4/2015 | Heim | G06K 9/00805 701/51 |
| 2016/0101775 A1* | 4/2016 | Gibson | B60K 6/387 701/22 |
| 2017/0261983 A1* | 9/2017 | Abe | G05D 1/0088 |
| 2020/0141486 A1* | 5/2020 | Hawley | B60W 30/18136 |

* cited by examiner

VEHICLE LOCALIZATION SYSTEM

INCORPORATION BY REFERENCE

The disclosure of Japanese Patent Application No. 2018-204969 filed on Oct. 31, 2018 including the specification, drawings and abstract is incorporated herein by reference in its entirety.

BACKGROUND

1. Technical Field

The present disclosure relates to vehicle localization systems.

2. Description of Related Art

Japanese Unexamined Patent Application Publication No. 2018-21777 (JP 2018-21777 A) is known as a technical document regarding a vehicle localization system. JP 2018-21777 A describes that the vehicle position, namely the vehicle's position on a map, is estimated by using the position of a landmark captured by a camera mounted on the vehicle in relation to the vehicle and position information of the landmark on the map.

SUMMARY

However, in vehicle localization using landmarks as in the above vehicle localization system, the landmarks' positions may not be accurately detected due to rain, backlight, etc. Moreover, there is not always a landmark around the vehicle. In this case, improvement in accuracy in estimating the vehicle position (lateral and longitudinal positions) by using landmarks cannot be expected.

The present disclosure provides a vehicle localization system that enables improvement of accuracy in estimating the longitudinal position of a vehicle even when no landmark can be used.

According to an aspect of the present disclosure, a vehicle localization system includes: an electronic control unit configured to estimate a vehicle position including a longitudinal position and a lateral position, the longitudinal position being a position of a vehicle on a map in an extension direction of a road on which the vehicle is traveling, and the lateral position being a position of the vehicle on the map in a lateral direction of the road; and a storage device that stores a map database including map information, the map information including height information or grade information of the road. The electronic control unit is configured to obtain a vehicle speed and a pitch angle of the vehicle traveling on the road. The electronic control unit is configured to perceive a measured position of the vehicle on the map based on a measurement result of a positioning device mounted on the vehicle and the vehicle speed. The electronic control unit is configured to estimate the longitudinal position from comparison between a rate of change in pitch angle of the vehicle along the road and a rate of change in height on the map along the road, based on the measured position of the vehicle on the map, the map information, and the pitch angle of the vehicle.

The vehicle localization system according to the aspect of the present disclosure can estimate the longitudinal position of the vehicle from the comparison between the rate of change in pitch angle of the vehicle along the road and the rate of change in height on the map along the road. The vehicle localization system thus has improved estimation accuracy of the longitudinal position of the vehicle even when no landmark can be detected around the vehicle.

In the vehicle localization system according to the aspect of the present disclosure, the electronic control unit may be configured to determine whether the vehicle is located near a characteristic height change section set in advance, based on the measured position of the vehicle on the map and the map information, and the electronic control unit may be configured to estimate the longitudinal position when determining that the vehicle is located near the characteristic height change section, and not to estimate the longitudinal position from the comparison between the rate of change in pitch angle of the vehicle and the rate of change in height on the map when determining that the vehicle is not located near the characteristic height change section.

The vehicle localization system does not estimate the longitudinal position from the comparison between the rate of change in pitch angle of the vehicle and the rate of change in height on the map when determining that the vehicle is not located near the characteristic height change section. The vehicle localization system thus avoids estimating the longitudinal position when it is difficult to estimate the longitudinal position by using a change in height, such as when the road is flat. The amount of computation of the system can thus be reduced.

The vehicle localization system according to the aspect of the present disclosure thus has improved estimation accuracy of the longitudinal position of the vehicle even when no landmark can be used.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described with reference to the accompanying drawings.

Figure 1:
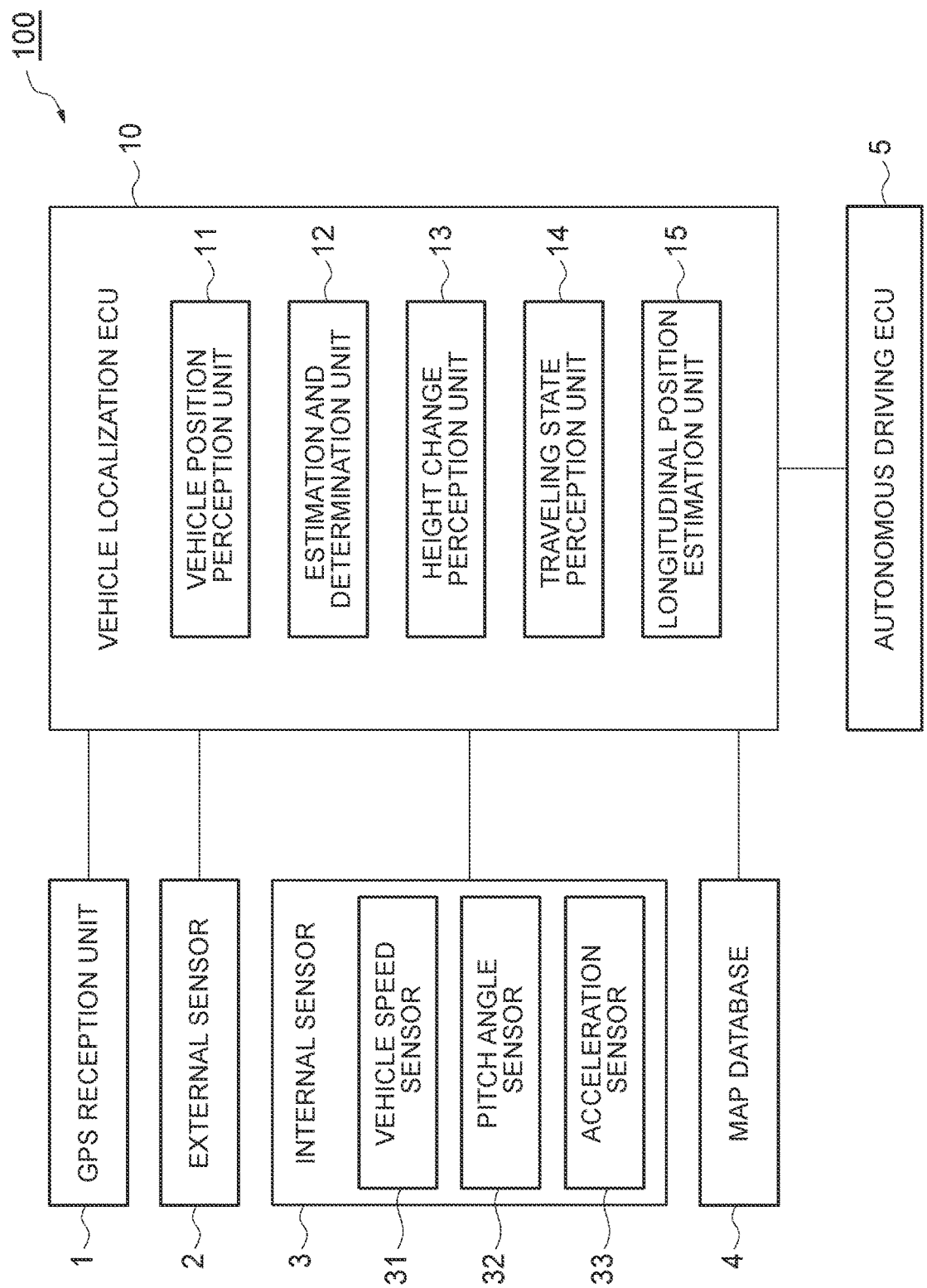
FIG. 1 is a block diagram of a vehicle localization system according to an embodiment.

A vehicle localization system 100 according to an embodiment shown in FIG. 1 is a device that is mounted on a vehicle such as a passenger car and that estimates the vehicle position, namely the vehicle's position on a map. The vehicle position includes a longitudinal position and a lateral position. The longitudinal position is a position on a map in the extension direction of a road on which the vehicle is traveling, and the lateral position is a position on a map in the lateral direction of a road on which the vehicle is traveling. The vehicle localization system 100 estimates the longitudinal position of the vehicle (the longitudinal position of the vehicle position) from comparison between change in height on a map and change in pitch angle of the vehicle in the extension direction of the road on which the vehicle is traveling. The vehicle localization system 100 provides the estimated vehicle position to an autonomous driving system or a driver assistance system of the vehicle, etc.

Configuration of Vehicle Localization System

As shown in FIG. 1, the vehicle localization system 100 includes a vehicle localization electronic control unit (ECU) 10 that performs overall control of the system. The vehicle localization ECU 10 is an electronic control unit having a central processing unit (CPU), a read only memory (ROM), a random access memory (RAM), a controller area network (CAN) communication circuit, etc. For example, the vehicle localization ECU 10 implements various functions by loading a program stored in the ROM into the RAM and executing the program loaded into the RAM by the CPU. The vehicle localization ECU 10 may be comprised of a plurality of electronic control units.

The vehicle localization ECU 10 is connected to a global positioning system (GPS) reception unit 1, an external sensor 2, an internal sensor 3, a map database 4, and an autonomous driving ECU 5.

The GPS reception unit 1 is a positioning device that measures the vehicle's position (e.g., the latitude and longitude of the vehicle) by receiving signals from three or more GPS satellites. The GPS reception unit 1 sends the measured position information of the vehicle (the measurement results) to the vehicle localization ECU 10. A global navigation satellite system (GNSS) reception unit may be used instead of the GPS reception unit 1.

The external sensor 2 is a detection device that detects the environment around the vehicle. The external sensor 2 includes at least one of a camera and a radar sensor.

The camera is an imaging device that captures the environment outside the vehicle. For example, the camera is mounted on the interior side of the windshield of the vehicle and captures an image ahead of the vehicle. The camera sends the captured information regarding the environment outside the vehicle to the vehicle localization ECU 10. The camera may be either a monocular camera or a stereo camera.

The radar sensor is a detection device that detects objects around the vehicle by using radio waves (e.g., millimeter waves) or light. Examples of the radar sensor include a millimeter wave radar or Light Detection and Ranging (LIDAR). The radar sensor emits radio waves or light to the surroundings of the vehicle and detects an object by receiving the radio waves or light reflected by the object. The radar sensor sends information on the detected object to the vehicle localization ECU 10. The objects include fixed obstacles such as a guardrail and a building and moving obstacles such as a pedestrian, a bicycle, and other vehicles.

The internal sensor 3 is a detection device that detects the traveling state of the vehicle. The internal sensor 3 includes a vehicle speed sensor 31, a pitch angle sensor 32, and an acceleration sensor 33.

The vehicle speed sensor 31 is a detector that detects the speed of the vehicle. For example, the vehicle speed sensor may be a wheel speed sensor that is mounted on a wheel of the vehicle, on a driveshaft that rotates with the wheel, etc. and detects the rotational speed of the wheel. The vehicle speed sensor 31 sends the detected vehicle speed information (wheel speed information) to the vehicle localization ECU 10.

The pitch angle sensor 32 is a detector that detects the pitch angle of the vehicle. The pitch angle is an angle due to pitching of the vehicle. For example, the pitch angle sensor 32 forms a part of an inertial measurement unit (IMU). The IMU is an inertial measurement unit that measures the roll, pitch, and yaw angles of the vehicle. The pitch angle sensor 32 sends the detected pitch angle information of the vehicle to the vehicle localization ECU 10. The internal sensor 3 may further include a yaw rate sensor. The internal sensor 3 may send angle information regarding the yaw rate etc. of the vehicle to the vehicle localization ECU 10.

The acceleration sensor 33 is a detector that detects the acceleration of the vehicle. The acceleration sensor 33 may form a part of the IMU to detect the acceleration of the vehicle. The acceleration sensor 33 sends the detected acceleration information including at least the longitudinal acceleration of the vehicle to the vehicle localization ECU 10. The acceleration information may include information on the lateral acceleration of the vehicle and/or information on the vertical acceleration of the vehicle in addition to the information on the longitudinal acceleration of the vehicle.

The map database 4 is a database of map information. For example, the map database 4 is stored in a storage device such as a hard disk drive (HDD) mounted on the vehicle. The map information includes road position information, road profile information (radii of curvature etc.), intersection position information, etc. The map database 4 may include position information of features (landmarks) that are used for positioning on a map. The features may include pavement markings such as stop lines, lane markings, utility poles, traffic lights, etc. The map database 4 may be stored in a server that can communicate with the vehicle.

The map information includes at least one of road height information and road grade information. For example, the height information includes information on heights at a plurality of points located at predetermined intervals in the extension direction of a road. The height information may include information on changes in height in the extension direction of a road. The height may be a legal elevation, a height above sea level according to the location, or a height from any desired datum plane. For example, the grade information includes information on grades at a plurality of positions located at predetermined intervals in the extension direction of a road. The grade information may include information on changes in grade in the extension direction of a road. The height information and the grade information are not limited to those described above. The height information and the grade information may be any information from which changes in height or grade along a road can be read.

The autonomous driving ECU 5 is an electronic control unit for providing autonomous driving of the vehicle. The autonomous driving ECU 5 has a CPU, a ROM, a RAM, etc. The autonomous driving ECU 5 may be an electronic control unit integrated with the vehicle localization ECU 10.

The autonomous driving ECU 5 calculates a course (a path and a vehicle speed profile) along a preset target route based on, e.g., the vehicle position, the map information in the map database 4, the environment around the vehicle obtained from the detection results of the external sensor 2, the vehicle state (the vehicle speed, the yaw rate, etc.) obtained from the detection results of the internal sensor 3. The target route may be either manually set by an occupant of the vehicle or automatically set by a well-known navigation system or the autonomous driving ECU 5. The autonomous driving ECU 5 can calculate a course by a well-known process. The autonomous driving ECU 5 performs autonomous driving of the vehicle along the course by sending control signals to actuators (an engine actuator, a brake actuator, a steering actuator, etc.) of the vehicle.

After calculating a course for autonomous driving, the autonomous driving ECU 5 sends the course information to the vehicle localization ECU 10. The autonomous driving ECU 5 need not necessarily send the course information to the vehicle localization ECU 10. The vehicle localization ECU 10 need not necessarily be connected to the autonomous driving ECU 5. Vehicles to be localized by the vehicle localization system 100 are not limited to autonomous vehicles.

Next, the functional configuration of the vehicle localization ECU 10 will be described. The vehicle localization ECU 10 includes a vehicle position perception unit 11, a height change perception unit 13, an estimation and determination unit 12, a traveling state perception unit 14, and a longitudinal position estimation unit 15.

The vehicle position perception unit 11 perceives the measured position, namely the vehicle's position on a map, based on the position information from the GPS reception unit 1 and the map information in the map database 4. In the case where estimation of the vehicle position has been performed by the vehicle localization system 100, the vehicle position perception unit 11 perceives the measured position of the vehicle from the vehicle speed detected by the vehicle speed sensor 31 by using the previous estimated vehicle position as a reference. That is, the vehicle position perception unit 11 perceives the measured position of the vehicle by what is called odometry. The vehicle position perception unit 11 may perceive the measured position of the vehicle by using the yaw rate of the vehicle in addition to the vehicle speed.

The vehicle position perception unit 11 may perceive the measured position of the vehicle by the simultaneous localization and mapping (SLAM) technique by using the position information of a feature (a landmark such as a lane marking) included in the map information in the map database 4 and the detection results of the external sensor 2.

The estimation and determination unit 12 determines whether the vehicle is located near a characteristic height change section based on the measured position of the vehicle perceived by the vehicle position perception unit 11 and the map information in the map database 4. The characteristic height change section is a section having a characteristic change in height and is a section in which estimation of the longitudinal position using the change in height is to be performed. For example, the characteristic height change section may be a section of a certain length in which the difference between the largest and smallest heights on a map (the amplitude of the rate of change in height on a map, which will be described later) is equal to or larger than a predetermined threshold.

The characteristic height change section may be limited to a section located a certain distance before a curve, an intersection, a junction, or a branch point. In autonomous driving or driver assistance, improved accuracy of the longitudinal position is sometimes desired especially for curves, intersections, junctions, or branch points. The characteristic height change section may be limited to a section of a straight road. For curves etc., a change in pitch angle of the vehicle may vary between when the vehicle travels along the inner side of the curve and when the vehicle travels along the outer side of the curve.

The estimation and determination unit 12 specifies the road on which the vehicle is traveling from, e.g., the measured position of the vehicle and the map information. The estimation and determination unit 12 sets, as a characteristic height change section, a section of the road which has a certain length and in which the difference between the largest and smallest heights on the map is equal to or larger than a predetermined threshold, based on the height information or grade information included in the map information. The estimation and determination unit 12 may set only a section of a straight road which is located a certain distance before a curve, an intersection, a junction, or a branch point as a characteristic height change section.

The estimation and determination unit 12 determines from the measured position of the vehicle and the characteristic height change section (the characteristic height change section preset before the determination) whether the vehicle is located near the characteristic height change section. As used herein, "near" means being located within a certain distance in the longitudinal direction of the vehicle along the road from, e.g., the measured position of the vehicle. Information on the characteristic height change section may be included in the map information.

When the estimation and determination unit 12 determines that the vehicle is located near the characteristic height change section, the height change perception unit 13 perceives the rate of change in height on the map along the road on which the vehicle is traveling, based on the measured position of the vehicle perceived by the vehicle position perception unit 11 and the height information or grade information included in the map information in the map database 4. The rate of change in height on the map refers to data indicating a change in height on the map in the extension direction of the road.

The height change perception unit 13 specifies the road on which the vehicle is traveling by referring to the map information by using the measured position of the vehicle. The height change perception unit 13 perceives the rate of change in height on the map along the road by extracting the height information or grade information corresponding to the road from the map information. For example, the height change perception unit 13 perceives the rate of change in height on the map in a section located within a certain distance from the measured position of the vehicle on the map. The height change perception unit 13 may perceive the rate of change in height on the map in the entire road (e.g., the entire road from one intersection to another).

Figure 2A:
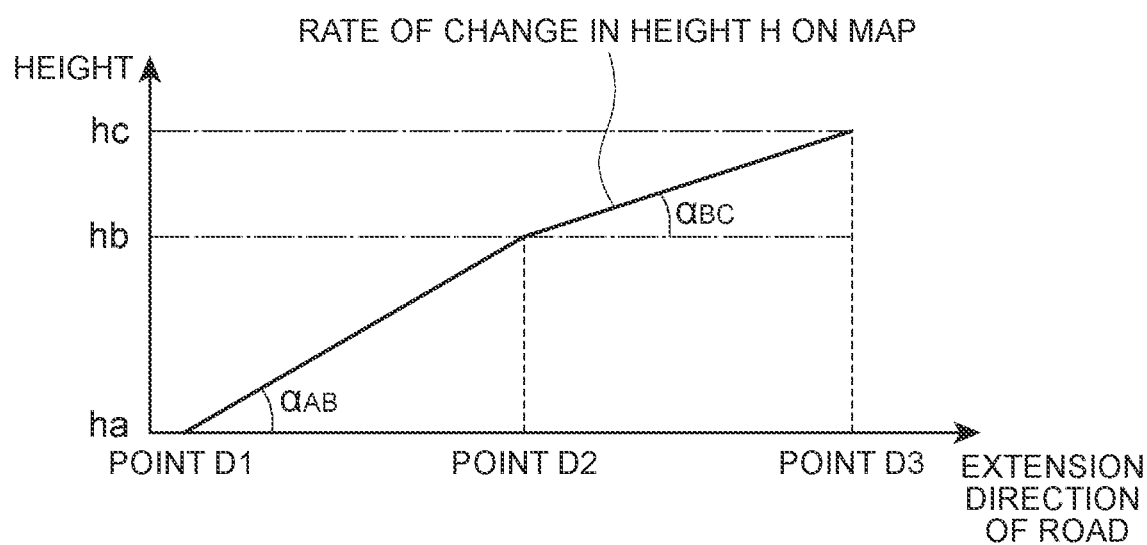
FIG. 2A is a graph illustrating how to calculate a rate of change in height on a map.

FIG. 2A is a graph illustrating how to calculate the rate of change in height on the map. In FIG. 2A, the ordinate represents height and the abscissa represents each point in the extension direction of the road. FIG. 2A shows Points D1, D2, D3 and the rate of change in height H on the map along the road. Points D1, D2, D3 are points (positions) on the road, whose height information is included in the map information. In FIG. 2A, ha represents the height at Point D1, hb represents the height at Point D2, and he represents the height at Point D3. Points D1, D2, D3 are located in this order in the extension direction of the road (the direction of travel on the road).

Figure 2B:
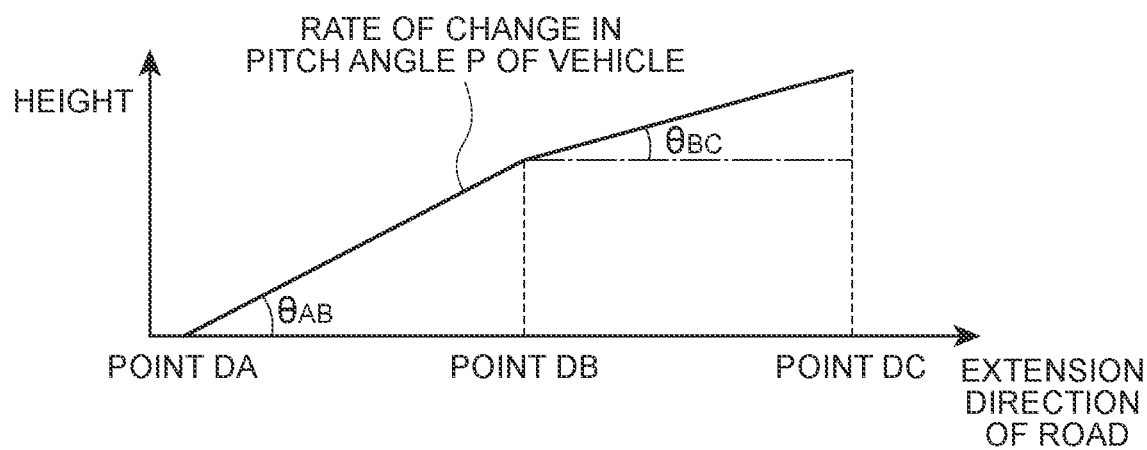
FIG. 2B is a graph illustrating how to calculate a rate of change in pitch angle of a vehicle.

In the situation of FIG. 2A, the height change perception unit 13 calculates the inclination angle $\alpha_{AB}$ of the road surface between Points D1 and D2 from the difference between the height ha at Point D1 and the height hb at Point D2 and the distance between Points D1 and D2. The distance between Points D1 and D2 can be obtained from the map information. The height change perception unit 13 similarly calculates the inclination angle $\alpha_{BC}$ of the road surface between Points D2 and D3. The height change perception unit 13 perceives (computes) the rate of change in height H on the map from Point D1 to Point D3 as shown in FIG. 2B by using the inclination angles $\alpha_{AB}$, $\alpha_{BC}$. The height change perception unit 13 may perceive the rate of change in height H on the map by calculating the inclination angle $\alpha_{AB}$ between Points D1 and D2 and the inclination angle $\alpha_{BC}$ between Points D2 and D3 from the grade information rather than from the height information.

The traveling state perception unit 14 perceives the traveling state of the vehicle based on the detection results of the internal sensor 3. The traveling state includes the vehicle speed, the acceleration of the vehicle, and the pitch angle of the vehicle. Specifically, the traveling state perception unit 14 perceives the vehicle speed based on the vehicle speed information from the vehicle speed sensor 31. The traveling state perception unit 14 perceives the pitch angle of the vehicle based on the pitch angle information from the pitch angle sensor 32. The traveling state perception unit 14 perceives the acceleration of the vehicle based on the acceleration information from the acceleration sensor 33. The traveling state may include the yaw rate of the vehicle.

The traveling state perception unit 14 obtains the pitch angle information of the vehicle from the pitch angle sensor 32 at regular time intervals. The time interval is, e.g., 100 ms. The traveling state perception unit 14 accumulates the information on a predetermined number of previous pitch angles (e.g., corresponding to a predetermined number of frames). The traveling state perception unit 14 similarly accumulates the vehicle speed information and the acceleration information.

When the estimation and determination unit 12 determines that the vehicle is located near the characteristic height change section, the longitudinal position estimation unit 15 estimates the longitudinal position of the vehicle. The longitudinal position estimation unit 15 estimates the longitudinal position of the vehicle based on the map information in the map database 4, the measured position of the vehicle perceived by the vehicle position perception unit 11, the rate of change in height on the map along the road perceived by the height change perception unit 13, and the traveling state of the vehicle perceived by the traveling state perception unit 14.

The longitudinal position estimation unit 15 first computes the rate of change in pitch angle of the vehicle along the road based on the measured position of the vehicle and the traveling state of the vehicle. The rate of change in pitch angle of the vehicle refers to data indicating a change in pitch angle caused as the vehicle travels.

The longitudinal position estimation unit 15 perceives the rate of change in pitch angle based on the accumulated information on a predetermined number of previous pitch angles. The longitudinal position estimation unit 15 converts the rate of change in pitch angle in relation to time to the rate of change in pitch angle in relation to distance (the rate of change in pitch angle at every certain distance) by using the measured position of the vehicle and the vehicle speed information of the vehicle. The longitudinal position estimation unit 15 computes the rate of change in pitch angle of the vehicle which is associated with the points on the road in relation to the measured position of the vehicle.

FIG. 2B is a graph illustrating how to calculate the rate of change in pitch angle of the vehicle. The ordinate and the abscissa in FIG. 2B are the same as those in FIG. 2A. FIG. 2B shows Points DA, DB, DC and the rate of change in pitch angle P of the vehicle. Points DA, DB, DC are points on the road. Points DA, DB, DC are located in this order in the extension direction of the road (the direction of travel on the road). In FIG. 2B, $\theta_{AB}$ represents the pitch angle of the vehicle at Point DA, and $\theta_{BC}$ represents the pitch angle of the vehicle at Point DB. Points DA, DB, DC are not necessarily the points corresponding to Points D1, D2, D3 in FIG. 2A.

In the situation of FIG. 2B, the longitudinal position estimation unit 15 perceives the pitch angle $\theta_{AB}$ of the vehicle at Point DA and the pitch angle $\theta_{BC}$ of the vehicle at Point DB based on the pitch angle information of the vehicle. The longitudinal position estimation unit 15 also calculates the distance between Points DA and DB based on the vehicle speed information of the vehicle. The longitudinal position estimation unit 15 similarly calculates the distance between Points DB and DC based on the vehicle speed information of the vehicle.

The longitudinal position estimation unit 15 computes the rate of change in pitch angle P of the vehicle shown in FIG. 2B based on the pitch angle $\theta_{AB}$ of the vehicle at Point DA, the pitch angle $\theta_{BC}$ of the vehicle at Point DB, the distance between Points DA and DB, and the distance between Points DB and DC.

The longitudinal position estimation unit 15 also computes the rate of change in pitch angle of the vehicle in view of the acceleration of the vehicle. The detection results of the pitch angle sensor 32 vary depending on, e.g., the acceleration (deceleration) of the vehicle. The longitudinal position estimation unit 15 therefore corrects the pitch angle in view of the acceleration at the time of perception of the pitch angle. The longitudinal position estimation unit 15 can correct the pitch angle from the acceleration of the vehicle by using table data in which the acceleration of the vehicle is associated in advance with the amount of correction to be made to the pitch angle detected by the pitch angle sensor 32. A preset arithmetic expression may be used instead of the table data. For example, the longitudinal position estimation unit 15 corrects the value of the pitch angle in such a direction that the higher the acceleration of the vehicle is, the more downward the front end of the vehicle is located. The longitudinal position estimation unit 15 may correct the value of the pitch angle in such a direction that the higher the deceleration (negative acceleration) of the vehicle is, the more upward the front end of the vehicle is located.

When sudden acceleration or sudden deceleration of the vehicle is perceived based on acceleration of the vehicle, the longitudinal position estimation unit 15 does not have to use the pitch angle obtained at the time of the sudden acceleration or sudden deceleration of the vehicle to calculate the rate of change in pitch angle of the vehicle. For example, sudden acceleration of the vehicle is perceived when an increase in acceleration within a certain time is equal to or larger than an increase threshold, and sudden deceleration of the vehicle is perceived when a decrease in acceleration (increase in deceleration) within a certain time is equal to or larger than a decrease threshold. The increase threshold and the decrease threshold are preset thresholds.

The longitudinal position estimation unit 15 may compute the rate of change in pitch angle of the vehicle based on the yaw rate of the vehicle. When it is perceived from a change in yaw rate of the vehicle that the vehicle is not traveling straight on the road (e.g., when it is perceived that the vehicle is meandering), the longitudinal position estimation unit 15 computes the rate of change in pitch angle of the vehicle along the road in view of the change in yaw rate. Whether the vehicle is traveling straight or not may be determined based on perception of lane markings on the road (line marking perception).

When the vehicle is in an autonomous driving mode and the vehicle localization ECU 10 has received a course for autonomous driving from the autonomous driving ECU 10, the longitudinal position estimation unit 15 may compute the rate of change in pitch angle of the vehicle based on the route for autonomous driving. When it is perceived from the route for autonomous driving that the vehicle in the autonomous driving mode is not traveling straight on the road, the longitudinal position estimation unit 15 computes the rate of change in pitch angle of the vehicle along the road in view of the route for autonomous driving.

The longitudinal position estimation unit 15 applies a noise reduction filter to the rate of change in pitch angle of the vehicle. Since the pitch angle may contain noise due to vertical vibration of the vehicle caused by an uneven road surface etc., the longitudinal position estimation unit 15 applies the noise reduction filter to reduce noise (e.g., high frequency components in the rate of change in pitch angle). The noise reduction filter may be a low pass filter. The longitudinal position estimation unit 15 may reduce noise by smoothing. For example, smoothing may be performed by calculating a 10-point moving average.

Figure 3A:
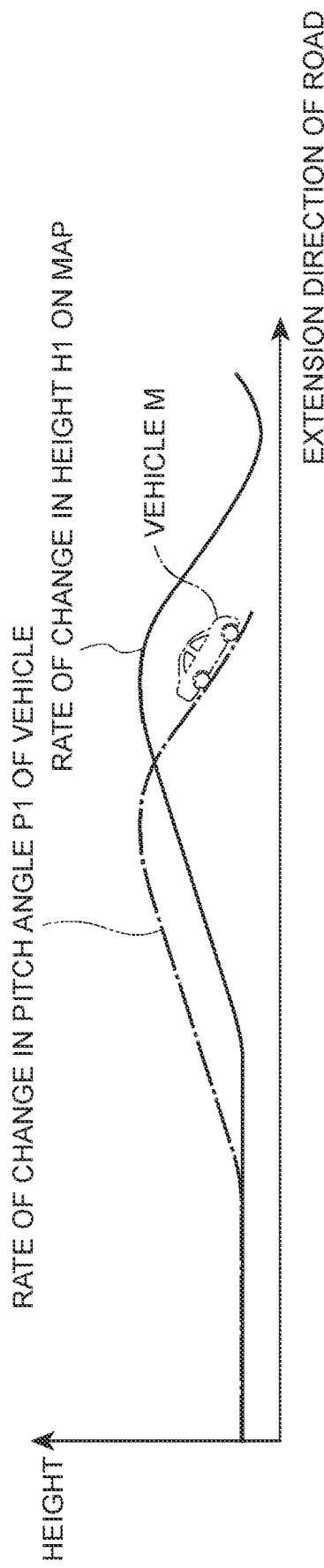
FIG. 3A is graph illustrating comparison between the rate of change in height on the map and the rate of change in pitch angle of the vehicle.

The longitudinal position estimation unit 15 calculates a longitudinal position error of the vehicle based on comparison between the rate of change in height on the map along the road perceived by the height change perception unit 13 and the rate of change in pitch angle of the vehicle along the road. FIG. 3A is a graph illustrating comparison between the rate of change in height on the map and the rate of change in pitch angle of the vehicle. The ordinate and the abscissa in FIG. 3A are the same as those in FIG. 2A. FIG. 3A shows a vehicle M traveling on a road, the rate of change in pitch angle P1 of the vehicle M along the road, and the rate of change in height H1 on a map along the road.

As shown in FIG. 3A, when the measured position of the vehicle contains a longitudinal position error, the rate of change in pitch angle P1 of the vehicle M and the rate of change in height H1 on the map are off from each other in the longitudinal direction. In the situation of FIG. 3A, the longitudinal position estimation unit 15 compares the rate of change in pitch angle P1 of the vehicle M and the rate of change in height H1 on the map to perform matching. The longitudinal position estimation unit 15 shifts the rate of change in pitch angle P1 of the vehicle M in the extension direction of the road to compute its degree of matching (degree of alignment) with the rate of change in height H1 on the map. The mean squared error may be used to compute the degree of matching. The longitudinal position estimation unit 15 may compute the degree of matching such that the smaller the mean squared error between the shifted rate of change in pitch angle P1 of the vehicle M and the rate of change in height H1 on the map is, the higher the degree of matching is.

The longitudinal position estimation unit 15 may compute a plurality of rates of change in pitch angle P1 of the vehicle by shifting the measured position of the vehicle, which is used as a reference, by a predetermined distance (e.g., 10 cm, −10 cm) at a time in the extension direction of the road. In this case, the longitudinal position estimation unit 15 computes the degree of matching between each of the rates of change in pitch angle P1 of the vehicle and the rate of change in height H1 on the map.

The longitudinal position estimation unit 15 determines whether the largest value of the degree of matching between the rate of change in pitch angle P1 of the vehicle M and the rate of change in height H1 on the map is equal to or larger than a matching threshold. The matching threshold is a preset threshold.

If the largest value of the degree of matching is not equal to or larger than the matching threshold, the longitudinal position estimation unit 15 does not estimate the longitudinal position as there is a problem such as too much noise in the rate of change in pitch angle P1. When the largest value of the degree of matching is equal to or larger than the matching threshold, the longitudinal position estimation unit 15 calculates a longitudinal position error.

Figure 3B:
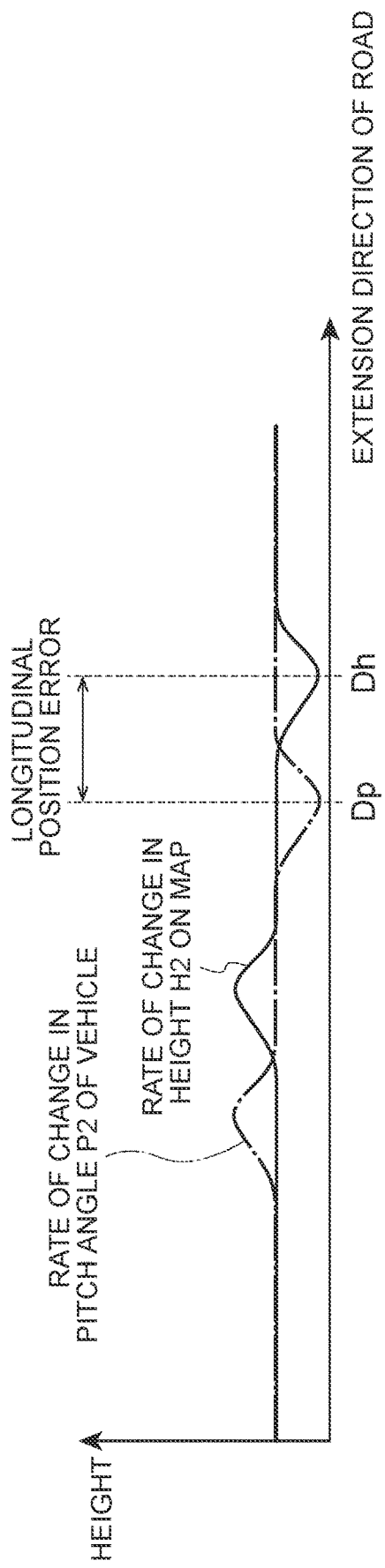
FIG. 3B is a graph illustrating how to calculate a longitudinal position error.

FIG. 3B is a graph illustrating how to calculate a longitudinal position error. FIG. 3B shows the rate of change in pitch angle P2 of the vehicle, the rate of change in height H2 on the map, Point Dp with the lowest rate of change in pitch angle P2 of the vehicle, and Point Dh with the lowest rate of change in height H2 on the map. The rate of change in pitch angle P2 of the vehicle and the rate of change in height H2 on the map are a combination with the degree of matching being equal to or larger than the matching threshold.

In the situation of FIG. 3B, the longitudinal position estimation unit 15 calculates a longitudinal position error corresponding to the distance between Point Dp and Point Dh from comparison between the rate of change in pitch angle P2 of the vehicle and the rate of change in height H2 on the map. The longitudinal position error corresponds to the amount by which the rate of change in pitch angle P2 of the vehicle based on the measured position of the vehicle is shifted in the extension direction of the road to the position where the degree of matching with the rate of change in height H2 on the map is the largest. For example, the longitudinal position estimation unit 15 calculates the longitudinal position error as a positive value in the case where the degree of matching with the rate of change in height H2 on the map becomes the largest when the rate of change in pitch angle P2 of the vehicle is shifted in the direction forward of the vehicle. Moreover, for example, the longitudinal position estimation unit 15 calculates the longitudinal position error as a negative value in the case where the degree of matching with the rate of change in height H2 on the map becomes the largest when the rate of change in pitch angle P2 of the vehicle is shifted in the direction rearward of the vehicle.

The longitudinal position estimation unit 15 estimates the longitudinal position of the vehicle (the longitudinal position of the vehicle position, which is an output value) by correcting the longitudinal position of the measured position of the vehicle by using the calculated longitudinal position error. For example, the longitudinal position estimation unit 15 corrects the longitudinal position of the measured position of the vehicle by an amount corresponding to the longitudinal position error. When the longitudinal position error is a positive value, the longitudinal position estimation unit 15 corrects the longitudinal position of the measured position of the vehicle to a position forward of the vehicle. When the longitudinal position error is a negative value, the longitudinal position estimation unit 15 corrects the longitudinal position of the measured position of the vehicle to a position rearward of the vehicle.

The longitudinal position estimation unit 15 may change the amount of correction of the longitudinal position according to the largest value of the degree of matching between the rate of change in pitch angle of the vehicle and the rate of change in height on the map. The smaller the largest value of the degree of matching is, the more likely the correction that is made by the longitudinal position estimation unit 15 is to be erroneous. Accordingly, the longitudinal position estimation unit 15 corrects the longitudinal position such that the smaller the largest value of the degree of matching is, the smaller the amount of correction of the longitudinal position is. For example, the longitudinal position estimation unit 15 makes such correction (the smaller the largest value of the degree of matching is, the smaller the amount of correction of the longitudinal position is) by multiplying the calculated longitudinal position error by a coefficient corresponding to the largest value of the degree of matching. The longitudinal position estimation unit 15 may correct the longitudinal position by a smaller amount in the case where the largest value of the degree of matching is smaller than a threshold of the largest value than in the case where the largest value of the degree of matching is equal to or larger than the threshold of the largest value. The longitudinal position estimation unit 15 may reduce the amount of correction of the longitudinal position in stages by using a plurality of thresholds.

The vehicle localization system 100 determines the longitudinal position estimated by the longitudinal position estimation unit 15 as the longitudinal position of the vehicle position. The lateral position of the vehicle position may be the same as the measured position. The vehicle localization system 100 outputs information on the vehicle position to the autonomous driving system or the driver assistance system as necessary.

Longitudinal Position Estimation Process of Vehicle Localization System

Figure 4:
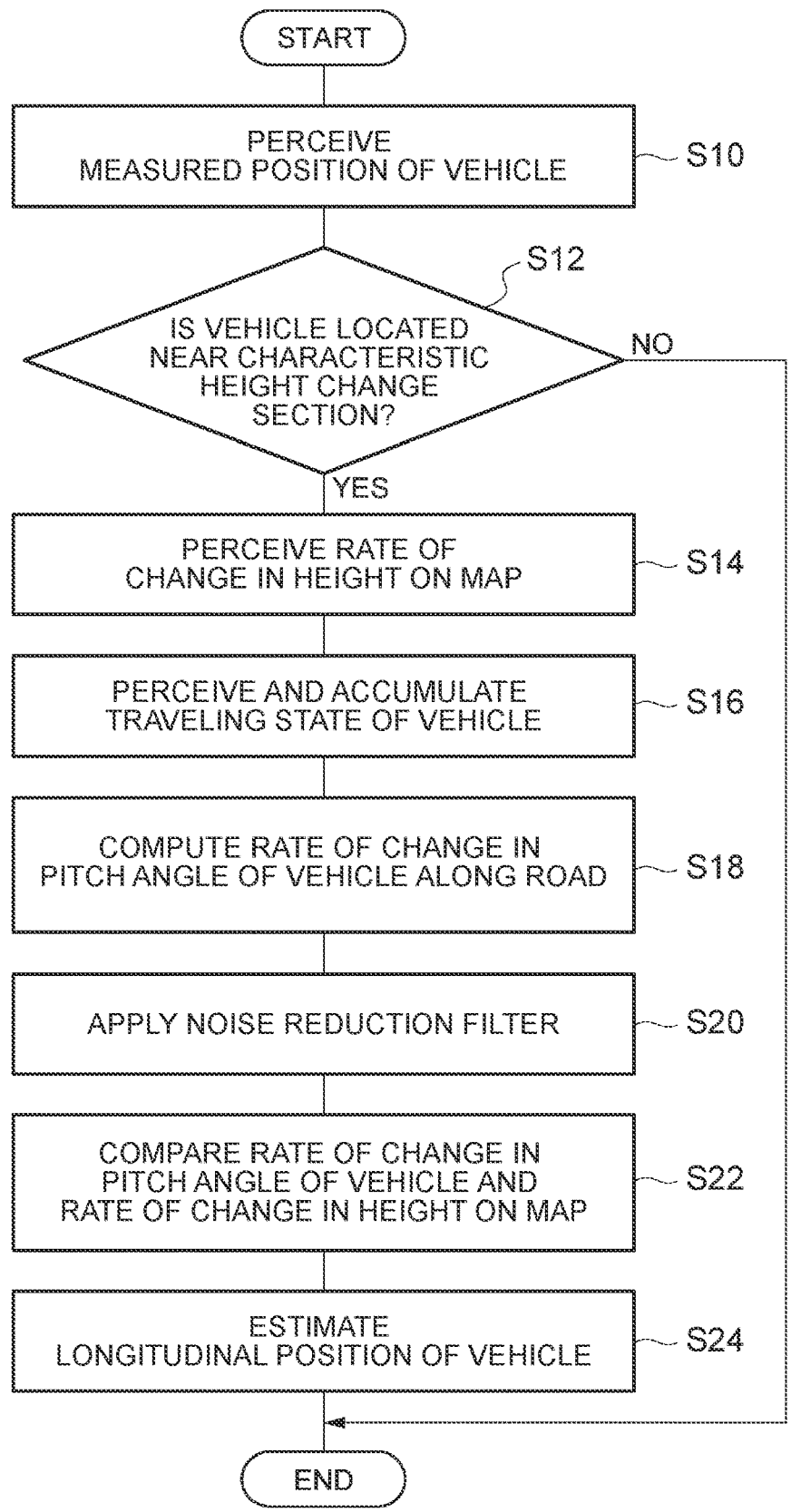
FIG. 4 is a flowchart illustrating an example of a longitudinal position estimation process of the vehicle localization system.

Next, a longitudinal position estimation process that is performed by the vehicle localization system 100 of the present embodiment will be described with reference to FIG. 4. FIG. 4 is a flowchart illustrating an example of the longitudinal position estimation process that is performed by the vehicle localization system 100. For example, the longitudinal position estimation process is performed during traveling of the vehicle.

As shown in FIG. 4, in S10, the vehicle position perception unit 11 of the vehicle localization ECU 10 of the vehicle localization system 100 perceives the measured position, namely the vehicle's position on a map. The vehicle position perception unit 11 perceives the measured position, namely the vehicle's position on the map, based on the position information from the GPS reception unit 1 and the map information in the map database 4. The vehicle position perception unit 11 perceives the measured position of the vehicle by odometry from the vehicle speed detected by the vehicle speed sensor 31 by using the previous estimated vehicle position as a reference.

In S12, the estimation and determination unit 12 of the vehicle localization ECU 10 determines whether the vehicle is located near the characteristic height change section. The estimation and determination unit 12 makes this determination based on the measured position of the vehicle perceived by the vehicle position perception unit 11 and the map information in the map database 4. When the estimation and determination unit 12 determines that the vehicle is not located near the characteristic height change section (S12: NO), the vehicle localization ECU 10 terminates the current longitudinal position estimation process. The vehicle localization ECU 10 then repeats the process from S10 after a certain time. When the estimation and determination unit 12 determines that the vehicle is located near the characteristic height change section (S12: YES), the routine proceeds to S14.

In S14, the height change perception unit 13 of the vehicle localization ECU 10 perceives the rate of change in height on the map along the road on which the vehicle is traveling. The height change perception unit 13 perceives the rate of change in height on the map based on the measured position of the vehicle perceived by the vehicle position perception unit 11 and the height information or grade information included in the map information in the map database 4.

In S16, the traveling state perception unit 14 of the vehicle localization ECU 10 perceives and accumulates the traveling state of the vehicle. The traveling state perception unit 14 perceives the traveling state of the vehicle based on the detection results of the internal sensor 3. For example, the traveling state perception unit 14 obtains pitch angle information of the vehicle from the pitch angle sensor 32 at regular time intervals and accumulates the information on a predetermined number of previous pitch angles. The same applies to vehicle speed information and acceleration information.

In S18, the longitudinal position estimation unit 15 of the vehicle localization ECU 10 computes the rate of change in pitch angle of the vehicle along the road. The longitudinal position estimation unit 15 computes the rate of change in pitch angle of the vehicle along the road based on the measured position of the vehicle and the traveling state of the vehicle.

In S20, the longitudinal position estimation unit 15 of the vehicle localization ECU 10 applies the noise reduction filter. Since the pitch angle may contain noise due to vertical vibration of the vehicle caused by an uneven road surface etc., the longitudinal position estimation unit 15 applies the noise reduction filter to the rate of change in pitch angle of the vehicle to reduce noise.

In S22, the longitudinal position estimation unit 15 of the vehicle localization ECU 10 compares the rate of change in height on the map along the road and the rate of change in pitch angle of the vehicle along the road. The longitudinal position estimation unit 15 calculates a longitudinal position error of the vehicle from the comparison between the rate of change in height on the map and the rate of change in pitch angle of the vehicle.

In S22, the longitudinal position estimation unit 15 of the vehicle localization ECU 10 estimates the longitudinal position of the vehicle. The longitudinal position estimation unit 15 estimates the longitudinal position of the vehicle position by correcting the longitudinal position of the measured position of the vehicle by using the calculated longitudinal position error.

As described above, the vehicle localization system 100 of the embodiment can estimate the longitudinal position of the vehicle from comparison between the rate of change in height on the map along the road and the rate of change in pitch angle of the vehicle along the road. The vehicle localization system 100 provides robustness against a change in environment such as when no landmark can be detected around the vehicle. The vehicle localization system 100 thus has improved estimation accuracy of the longitudinal position of the vehicle.

Moreover, the vehicle localization system 100 does not estimate the longitudinal position from the comparison between the rate of change in height on the map and the rate of change in pitch angle of the vehicle if it is determined that the vehicle is not located near the characteristic height change section. The vehicle localization system 100 thus avoids estimating the longitudinal position when it is difficult to estimate the longitudinal position by using a change in height, such as when the road is flat. The amount of computation of the system can thus be reduced.

Although the embodiment of the present disclosure is described above, an applicable embodiment of the present disclosure is not limited to the above embodiment. In addition to the above embodiment, an applicable embodiment of the present disclosure can be carried out in various forms including various modifications and improvements that are made based on the knowledge of those skilled in the art.

For example, the vehicle localization system 100 may form a part of the autonomous driving system or the driver assistance system. The vehicle localization ECU 10 of the vehicle localization system 100 need not necessarily have the estimation and determination unit 12. The vehicle localization ECU 10 may estimate the longitudinal position by using a change in height, regardless of whether the road has a section with a characteristic change in height. For example, regardless of whether the road has a section with a characteristic change in height, the vehicle localization ECU 10 may estimate the longitudinal position by using a change in height when the vehicle is located near a section of a straight road which is located a certain distance before a curve, an intersection, a junction, or a branch point.

The longitudinal position estimation unit 15 need not necessarily compute the rate of change in pitch angle of the vehicle in view of acceleration. In this case, the acceleration of the vehicle need not be included in the traveling state. The same applies to the yaw rate and the course for autonomous driving. The longitudinal position estimation unit 15 need not necessarily use the noise reduction filter.

What is claimed is:

1. A vehicle localization system, comprising:
an electronic control unit programmed to:
estimate a vehicle position including a longitudinal position and a lateral position, the longitudinal position being a position of a vehicle on a map in an extension direction of a road on which the vehicle is traveling, and the lateral position being a position of the vehicle on the map in a lateral direction of the road; and
a storage device that stores a map database including map information, the map information including height information or grade information of the road, wherein:
the electronic control unit is programmed to:
obtain a vehicle speed and a pitch angle of the vehicle traveling on the road;
perceive a measured position of the vehicle on the map based on a measurement result of a positioning device mounted on the vehicle and the vehicle speed; and
estimate the longitudinal position from comparison between a rate of change in pitch angle of the vehicle along the road and a rate of change in height on the map along the road, based on the measured position of the vehicle on the map, the map information, and the pitch angle of the vehicle.

2. The vehicle localization system according to claim 1, wherein
the electronic control unit is further programmed to:
determine whether the vehicle is located near a characteristic height change section set in advance, based on the measured position of the vehicle on the map and the map information, and
the longitudinal position when determining that the vehicle is located near the characteristic height change section, and not to estimate the longitudinal position from the comparison between the rate of change in pitch angle of the vehicle and the rate of change in height on the map when determining that the vehicle is not located near the characteristic height change section.

* * * * *